Nov. 9, 1943.                D. B. AVERY                 2,333,912
                         TRAILER STEERING MECHANISM
                            Filed April 29, 1942            2 Sheets-Sheet 1

INVENTOR.
Dallas B. Avery
BY
ATTORNEY

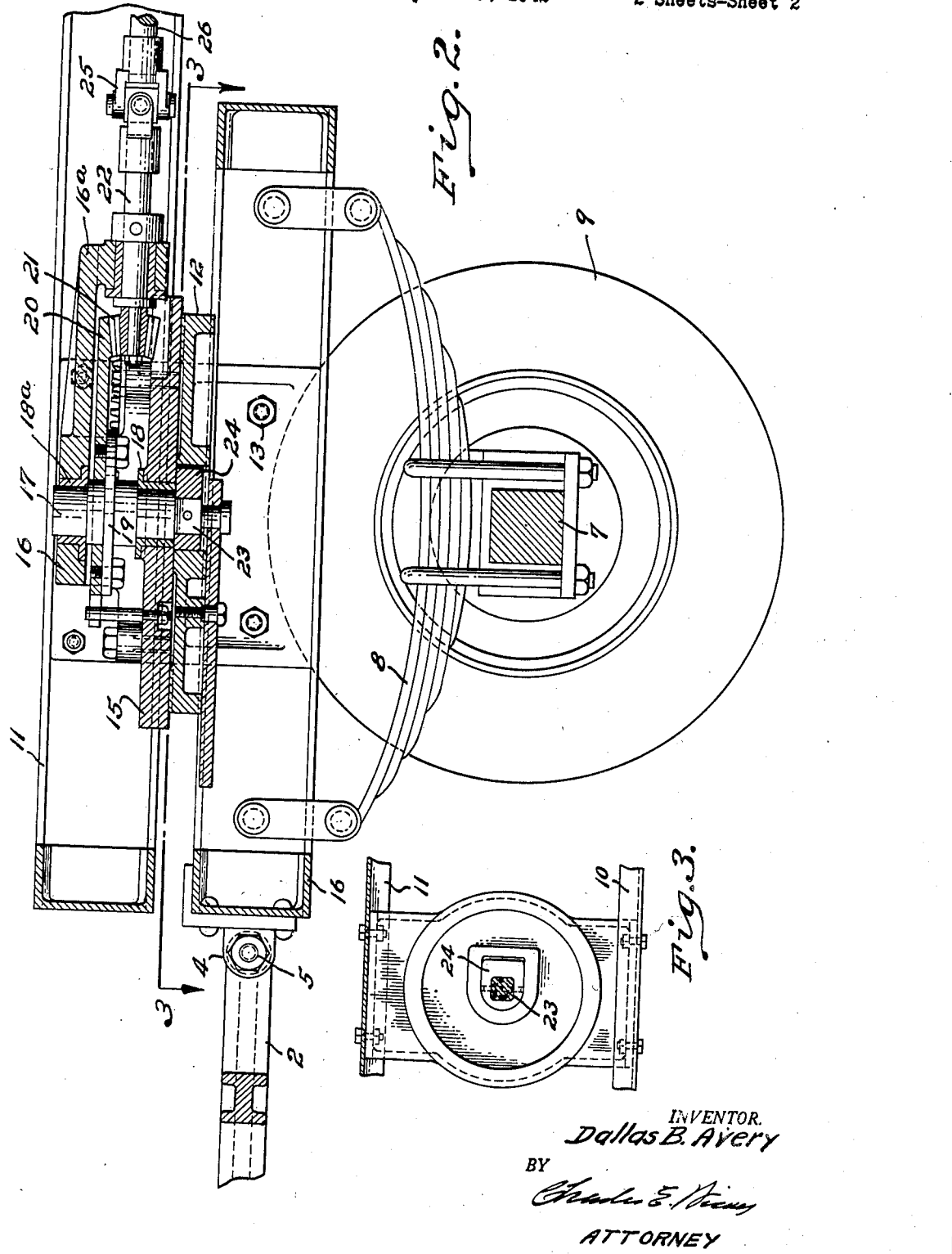

Patented Nov. 9, 1943

2,333,912

UNITED STATES PATENT OFFICE 2,333,912

TRAILER STEERING MECHANISM

Dallas B. Avery, Capac, Mich.

Application April 29, 1942, Serial No. 441,040

5 Claims. (Cl. 280—33.55)

This invention relates to automobile trailer construction and particularly involves new and improved mechanism actuated by the turning of a tractor for steering the forward and rear wheels of the trailer so that the rear wheels of the trailer when the trailer is turned are caused to follow the tracks of the forward trailer wheels.

A further object of the invention is to provide means forming part of the trailer construction to which a tractor vehicle is connected and by the turning of the tractor vehicle the mechanism for turning the wheels of the trailer is actuated to cause the trailer wheels to follow the track of the rear wheels of the tractor to thus avoid the necessity of the trailer wheels making a new track in soft earth or snow and thus reducing the load on the tractor.

These and various other objects and features of my invention are hereinafter more fully described and claimed and the preferred form of construction of an automobile trailer running gear is shown in the accompanying drawings in which—

Fig. 2 is an enlarged vertical section taken on line 2—2 of Fig. 1 showing the forward wheels of the trailer carried by a sub-frame to which the tractor is connected.

Fig. 3 is a horizontal section taken on line 3—3 of Fig. 2.

Figure 1:
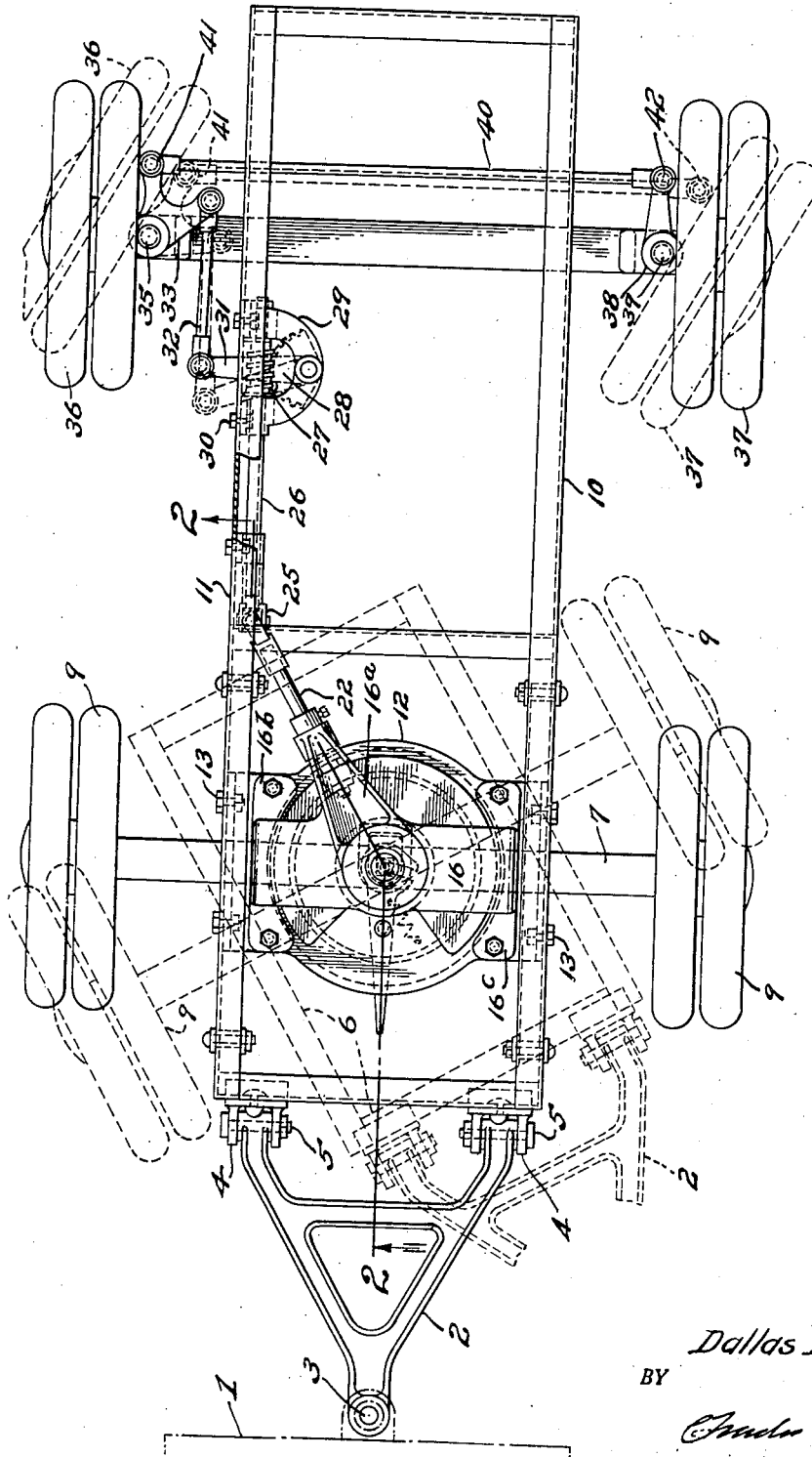
Fig. 1 is a plan view showing my improved trailer steering mechanism and manner of connection thereof with a tractor.

In the usual four wheeled trailer structures the front and rear axles are fixed to the trailer frame and thus the wheels of the trailer do not tend to follow the wheel tracks of the tractor in passing around a curve. My improved trailer mechanism involves means for turning the wheels of the trailer as a result of change in direction of movement of the tractor to cause the trailer wheels to follow the track made by the tractor wheels, and further to cause the rear wheels of the tractor to turn at an opposite angle to the angle of the forward wheels in respect to the longitudinal center line of the trailer to cause the rear trailer wheels to follow the track of the forward trailer wheels.

In Fig. 1 the rear end of the tractor is indicated at 1 to which the V shaped tongue 2 is vertically pivoted at its apex to the pivot pin 3 securing the same to the tractor and has two horizontally spaced opposite ends pivoted to the brackets 4 by the bolts 5 to turn on a horizontal axis. The brackets 4 are attached to the forward end of a sub-frame 6 as will be more clearly understood from Fig. 2. The sub-frame is preferably of rectangular form and the front axle 7 of the trailer is spring supported to the sub-frame 6 as by leaf springs 8 there being a leaf spring 8 on opposite sides of the pivotal axis of the sub-frame 6. The wheels 9 are rotatably supported at opposite ends of the axis 7 and by the turning of the sub-frame 6 as shown by dotted lines in Fig. 1 the wheels are turned in angular relation to the parallel side members 10 and 11 of the trailer frame.

The sub-frame 6 carrying the front axle in fixed transverse relation therewith has the cross plate 12 secured at opposite ends to the respective side frames 10 and 11 of the trailer as by bolts 13. The upper surface of the cross member 12 is shaped to provide a bearing of circular form on which the plate 15 rides and the plate 15 is secured at opposite ends to the lower flange of the spaced frame elements 10 and 11 of the main trailer frame. Also secured to the plate 15 is a transversely extending plate 16 which is vertically spaced at its center from the plate 15. The plates 15 and 16 have aligned apertures to receive a vertical shaft 17 supported by a bearing element 18 in the plate 15 and a bearing element 18a in the plate 16. Intermediate the said bearing elements the vertical shaft 17 has a horizontal flange 19 to which is secured a beveled gear 20 on the lower face of which the teeth are provided and which mesh with a pinion 21 carried on the shaft 22. The pinion 21 is rotatably supported in a projecting arm 16a fixed to the plate 16. The plate 16 has opposite flanged ends 16b and 16c which as shown in Fig. 2 are bolted to the plate 15. Thus the plate 16, arm 16a and the shaft 22 are held in fixed position while the sub-frame 6 may turn on the axis of the shaft 17.

The upper face of the cross plate 12 has an opening to receive a block 23 which is pinned to the lower end of the vehicle shaft 17 and has a square side member 24 extending into a recess in the upper face of the cross member 12. By turning the sub-frame 6, axle 7 carrying the forward wheels 9 the shaft 17 will be turned on a vertical axis thereby rotating the gear 20, pinion 21 and shaft 22. The shaft 22 is connected by a universal joint 25 with a shaft 26 supported in the side frame 10 of the trailer as will be understood from Fig. 1. The shaft 26 has a worm 27 thereon which meshes with a segmental worm gear 28 which is supported by a casting 29 secured to the vehicle frame by bolts 30. The segmental gear 28 has an arm 31 fixed thereto at one end and to the opposite end of which is pivoted an end of the arm 32. The opposite end of the arm 32 is pivoted to one end of an arm 33 and the opposite end of the arm 33 is pivotally supported on a rear axle 34 as by a pin 35 which extends through the said end of the arm and end of the fixed axle so that the rear wheels 36 may turn on the pin 35 as an axis. The pivoted end of the arm 33 is fixedly secured to the wheels 36. The rear wheels 37 on the opposite end of the axle 34 are supported by the bracket 38 which is pivoted at 39 to turn on a vertical axis and this arm is connected by the rod 40 to a pivot member 41 to which the arm 32 is connected. The opposite end of the rod 40 is pivoted at 42 to the bracket 38. Thus by turning of the arm 31 by the gear segment 28 both the rear wheels of the tractor are turned to like extent to occupy an angular position relative to the fixed shaft 34 and side of the trailer frame and at an opposite angle to that occupied by the wheels 9.

By this arrangement the rear wheels are caused to carry the rear end of the trailer in a direction opposite the direction of movement of the front end of the trailer. The rear wheels thus follow the arcuate path of the front wheels when the tractor vehicle is turned in one direction or the other from the longitudinal center line of the trailer frame which passes through the axis of the pin 3.

It should be borne in mind that the turning of the tractor to produce a side pull on the trailer tongue 2 horizontally pivoted to the sub-frame 6 causes the sub-frame to turn on a vertical axis as indicated by the dotted lines in Fig. 1 and it is the turning of this sub-frame on the axis of the vertical shaft 17 that rotates the shafts 22 and 26 to turn the rear wheels on their pivots at the opposite ends of the axle 34 and the turning of these rear wheels 36 and 37 on their pivots causes the trailer frame 11 to turn on the axis of the shaft 17. The rear end of the trailer is therefore caused to traverse substantially the same arcuate path as the front wheels 9 on opposite ends of the axle 7. The front wheels 9 of the trailer are caused to follow the track of the rear wheels of the trailer as the side pull of the trailer on the pivoted tongue 2 attached to the sub-frame 6 will turn the front axle and wheels fixed thereto to other than a right angle to the main trailer frames 10 and 11.

Thus the trailer frame pivoted on the axis of the shaft 17 is caused to turn at one angle or the other depending upon the direction of rotation of the sub-frame 6 due to change in direction of movement of the tractor. This tends to carry the rear end of the trailer frame outwardly in respect to the arc of movement of the forward wheels of the trailer and thus cause the rear trailer wheels to follow the track of the front trailer wheels.

It is further to be observed that the front trailer wheels are caused to follow the track of the rear wheels of the tractor due to the fact that the tongue 2 of the trailer sub-frame is pivoted to turn on a vertical axis relative to the trailer. The turning of the trailer in one direction or the other exerts a side thrust on the trailer tongue 2 and consequently turns the trailer sub-frame 6 and wheels 9 on the axis of the shaft 17. Thus the front axle carrying the wheels 9 on being turned about the axis of the shaft 17, as the tractor turns to one side or the other, causes the front wheels 9 of the trailer to follow the tracks of the rear tractor wheels not shown in the drawings.

It is believed evident from the foregoing description of the parts and structural and functional relationship thereof, that an automobile trailer according to my invention is comparatively simple and inexpensive and that various changes and modifications may be made in the form and arrangement of the parts without departing from the spirit and scope of the invention as set forth in the claims.

Having thus fully described my invention, its utility and mode of operation, what I claim and desire to secure by Letters Patent of the United States is:

1. A four wheeled automobile trailer comprising a main frame, a rear axle supported at the rear end of and in fixed relation with the main frame, wheel elements pivoted to turn on a vertical axis at opposite ends of the rear axle, a front axle, wheel elements rotatably mounted on the opposite ends of the front axle, a sub-frame supporting the front axle, means pivotally supporting the sub-frame on the forward portion of the main frame to permit turning of the sub-frame on a vertical axis, a tongue attached to the sub-frame at one end, and adapted to be pivotally connected with the tractor element to permit turning of the tractor element whereby change in direction of movement of the tractor causes the sub-frame to turn on a vertical axis, a gear turnable with the sub-frame, means including a gear actuated by rotation of the said first named gear to turn the rear wheels on their pivots at a reverse angle and to the same degree as the wheels of the front axle are turned by the tractor.

2. A four wheeled automobile trailer comprising a main frame, a rear axle supported at the rear end of and in fixed relation with the main frame, wheel elements pivoted to turn on a vertical axis at opposite ends of the rear axle, a front axle, wheel elements rotatably mounted on the opposite ends of the front axle, a sub-frame supporting the front axle, means pivotally supporting the sub-frame on the forward portion of the main frame to permit turning of the sub-frame on a vertical axis, a tongue attached to the sub-frame at one end, and adapted to be pivotally connected with the tractor element to permit turning of the tractor element whereby change in direction of movement of the tractor causes the sub-frame to turn on a vertical axis, a gear turnable with the sub-frame, and means including a worm gear rotatable by the first named gear, a gear segment meshing with the said worm, and means connected with the gear segment whereby turning thereof by the worm gear turns the rear wheels on their respective pivots to the same degree and at an angle the reverse of that to which the wheels of the front axle are turned by the tractor.

3. A four wheeled automobile trailer comprising a main frame, a rear axle fixed transversely of the rear end of the main frame, wheel elements pivotally attached to the opposite ends of the rear axle, a front axle, a sub-frame to which the front axle is secured, means pivotally supporting the sub-frame to turn on a vertical axis relative to the forward portion of the main frame, a tongue pivotally attached to the sub-frame to turn on a horizontal axis and adapted to be pivotally connected to a tractor element to permit the tractor element to turn on a vertical axis in respect to the tongue whereby a side draft on the tongue by the tractor turns the front frame, a gear carried at the forward end of the trailer frame and secured to turn on the pivot of the sub-frame, a gear means supported at the rear of the trailer frame, means operatively connecting the said last named gear with the gear at the forward end of the main frame, and means between the gear carried at the rear of the frame and the rear wheels whereby rotation of the last named gear turns the rear wheels on their pivot at an opposed angle to that to which the front wheels are turned by the tractor element.

4. A four wheeled trailer vehicle comprising a main frame, a rear axle supported at the rear end of the main frame, a wheel element pivotally attached to each of the opposite ends of the rear axle to turn on a vertical axis, a front axle, wheel elements rotatably secured to opposite ends of the front axle, a sub-frame supporting the front axle, means including a vertical shaft pivotally supporting the sub-frame to the forward end of the main frame and fixed to the sub-frame, a gear on the said shaft and rotatable therewith, a shaft connected to the last named gear, a worm on the said shaft supported by the main frame, a worm gear actuated by rotation of the worm, steering knuckles on each of the rear wheels for turning the same on a vertical axis, and a connection between the worm gear and the said steering knuckles, said shafting and gear train providing a means whereby the turning of the sub-frame and front wheels on a vertical axis to an angular position in respect to the longitudinal center line of the main frame causes the rear wheels to turn on their vertical axes at an angle opposite and equal to the angle to which the front wheels may be turned by the sub-frame.

5. A four wheeled trailer vehicle comprising a main frame, a rear axle spring supported in respect to the main frame, a wheel element pivotally supported at each of the opposite ends of the rear axle to turn on a vertical axis, a front axle, wheel elements rotatably secured on opposite ends of the front axle, a sub-frame, spring means supporting the front axle relative to the sub-frame, means including a vertical shaft pivotally supporting the sub-frame to the forward end of the main frame and fixed to turn with the said frame, means being the vertical shaft and the rear wheels whereby turning of the sub-frame and vertical shaft causes the rear wheels to turn on their vertical axes at an angle to the longitudinal axis of the main frame corresponding to and the reverse of the angle to which the front wheels are turned by the turning of the sub-frame.

DALLAS B. AVERY.

CERTIFICATE OF CORRECTION.

Patent No. 2,333,912.  November 9, 1943.

DALLAS B. AVERY.

It is hereby certified that error appears in the printed specification of the above numbered patent requiring correction as follows: Page 3, second column, line 18, claim 5, for "means being" read --means between--; and that the said Letters Patent should be read with this correction therein that the same may conform to the record of the case in the Patent Office.

Signed and sealed this 8th day of February, A. D. 1944

(Seal)

Henry Van Arsdale,
Acting Commissioner of Patents.